(12) United States Patent
Bailey

(10) Patent No.: US 6,334,594 B1
(45) Date of Patent: Jan. 1, 2002

(54) ADJUSTABLE INDICATOR MOUNT

(75) Inventor: Boice R. Bailey, New Stanton, PA (US)

(73) Assignee: Boice Industrial Corp., Ruffsdale, PA (US)

( * ) Notice: Subject to any disclaimer, the term of this patent is extended or adjusted under 35 U.S.C. 154(b) by 0 days.

(21) Appl. No.: 09/569,812

(22) Filed: May 12, 2000

(51) Int. Cl.[7] .................................................. A47F 5/00
(52) U.S. Cl. ................................ 248/125.1; 248/219.4
(58) Field of Search ......................... 248/125.1, 125.2, 248/125.3, 218.4, 219.4

(56) References Cited

U.S. PATENT DOCUMENTS

| | | | | |
|---|---|---|---|---|
| 2,469,904 A | * | 5/1949 | Szuba | 248/125.1 |
| 3,269,681 A | * | 8/1966 | Azim | 248/125.1 X |
| 3,795,377 A | * | 3/1974 | Dietrich | 248/125.2 |
| 4,284,257 A | * | 8/1981 | Murkens | 248/125.9 |
| 5,996,946 A | * | 12/1999 | Bailey | 248/125.1 |

* cited by examiner

Primary Examiner—Ramon O. Ramirez
(74) Attorney, Agent, or Firm—Richard K. Thomson

(57) ABSTRACT

A support assembly for a precision gauge includes a base block, a support post, a platform which can be coarse adjusted up and down the post using a locking screw, and an support arm which has a portion received by a hollow end of the platform. A fine adjustment screw moves the support arm with the attached precision gauge vertically up and down two dowel pins secured within the hollow portion of the platform. The base block is machined to within 0.0001 inch smoothness to permit the machined element to be measured to be positioned directly on the base block.

20 Claims, 4 Drawing Sheets

ADJUSTABLE INDICATOR MOUNT

BACKGROUND AND SUMMARY OF THE INVENTION

The present invention is directed to an indicator mount. More particularly, the present invention is directed to a support assembly for a precision gauge including a base for mounting a finger gauge that includes its own support surface and provides linear vertical adjustment.

The present invention is related to the invention described and claimed in U.S. Pat. No. 5,996,946 issued Dec. 7, 1999 entitled Height Gauge Support Stand. As described therein, tool and machine shops, use precision gauges to verify that a machined article has been manufactured within the desired tolerances. A height gauge is used to verify that the vertical dimension is what it ought to be. A precision gauge is mounted on a support stand and positioned upon a granite surface plate that has been polished to have a surface flatness within millionths of an inch. Gauge blocks which have been ground and lapped to a particular dimension are used to calibrate the height gauge and the measurement transferred to the machined article to verify that it is within tolerance.

Not every machine shop can afford the expense of a precisely ground support plate or table. In addition, many of the existing support stands tilt the gauge as a means to effect fine adjustment. While this tilting affords adequate adjustment, it is far from optimum since it changes the angularity with which the gauge engages the surface it is to measure.

The present invention overcomes the deficiencies of the prior art. The adjustable indicator mount of the present invention provides an assembly including a base which supports the article to be measured. The support assembly includes a base that is machined to within 0.0001 inch smoothness. This obviates the need for an expensive granite table. The support assembly further includes a platform which may be coarse adjusted vertically along a post. The platform is provided with an opening that receives one end of the support arm and a screw moves it vertically along a pair of dowel pins to permit fine adjustment in the form of pure translational movement.

Various other features, advantages and characteristics of the present invention will become apparent to one of ordinary skill in the art after a reading of the following specification.

BRIEF DESCRIPTION OF THE DRAWINGS

The preferred embodiments of the present invention are described in conjunction with the associated drawings in which like features are indicated with like reference numerals and in which.

DETAILED DESCRIPTION OF PREFERRED EMBODIMENT(S)

Figure 1:
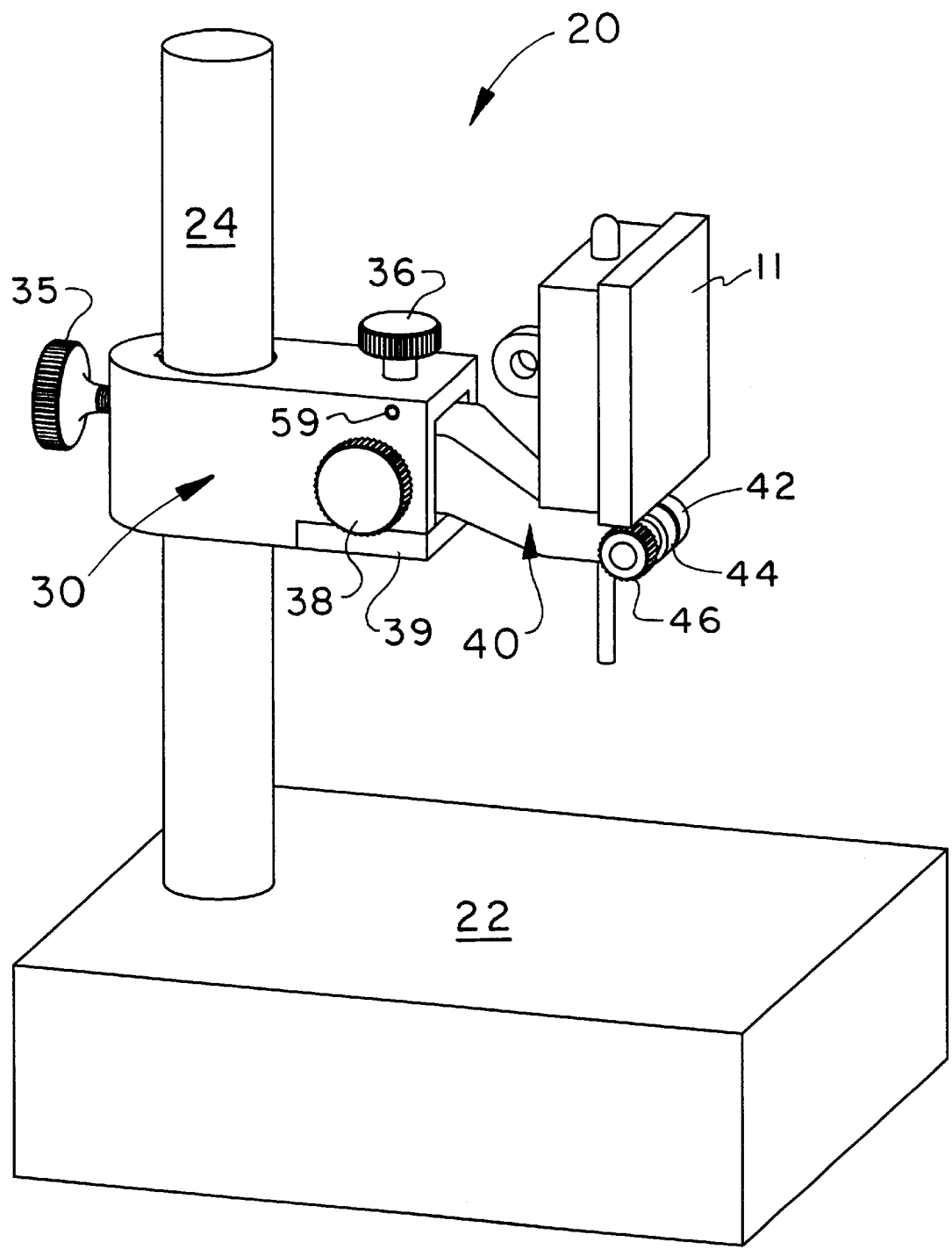
FIG. 1 is a perspective view of a first embodiment of the adjustable indicator mount of the present invention.
Figure 2:
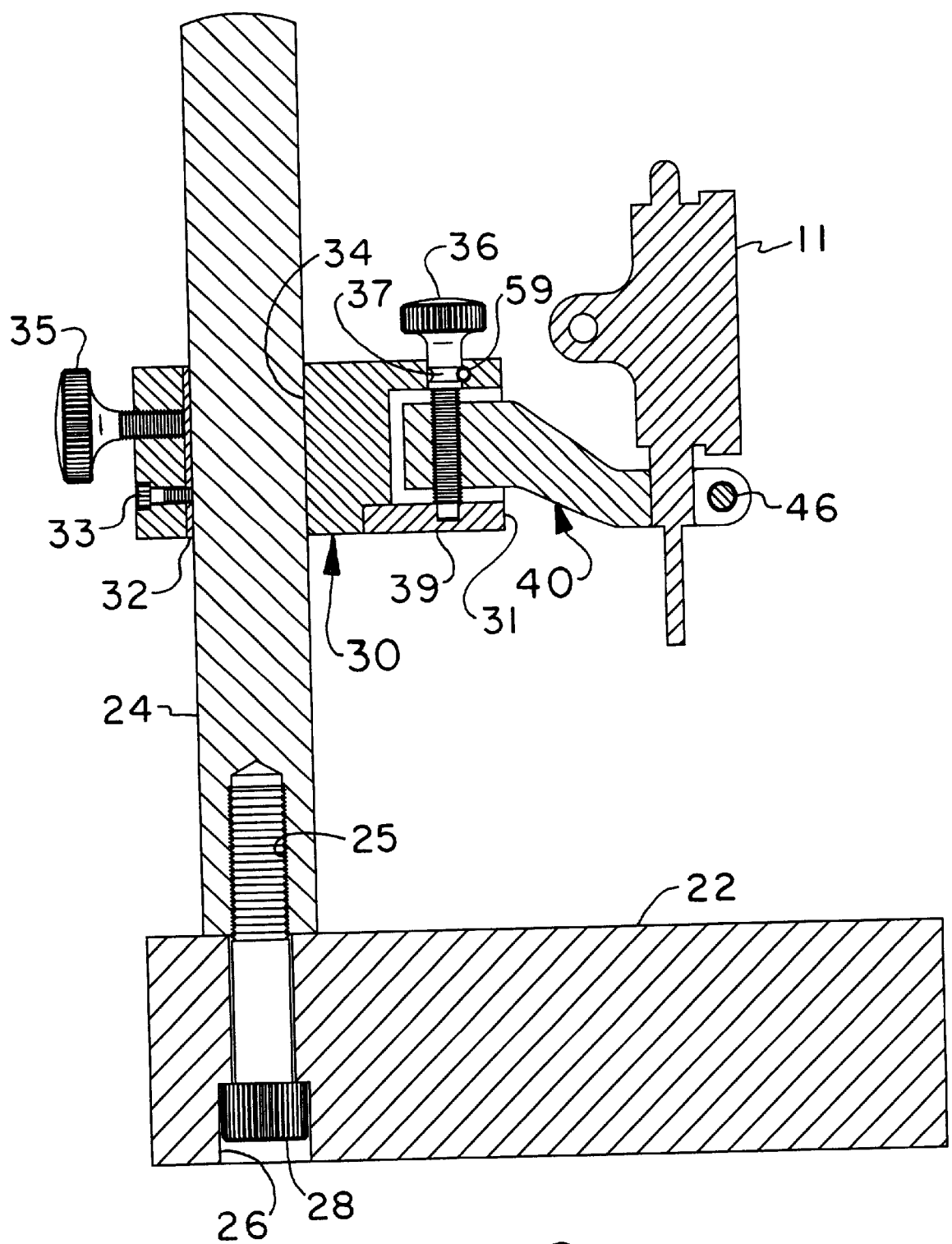
FIG. 2 is a cross-sectional side view of the first embodiment.

The adjustable indicator mount of the present invention comprises a support assembly shown in FIGS. 1 and 2 generally at 20. Assembly 20 includes a granite base block 22 machined smooth to within 0.0001 inch, a support post 24 extending vertically from base block 22, a platform 30 and support arm 40. Post 24 is attached to base 22 by bolt 28 (FIG. 2) which extends through aperture 26 in block 22 and is threaded into axial bore 25 in the end of post 24.

As better seen in FIG. 2, platform 30 includes hollow end 31 and a friction plate 32 secured in bore 34 by screw 33. Securement screw 35 tilts friction plate 32 into firm contact with support post 24 and provides means to provide coarse vertical adjustment of the precision gauge 11 at the approximate height desired. Platform 30 further includes a fine adjustment screw 36, a locking screw 38 and a removable access plate 39, each of which will be described in further detail in conjunction with support arm 40.

Figure 3:
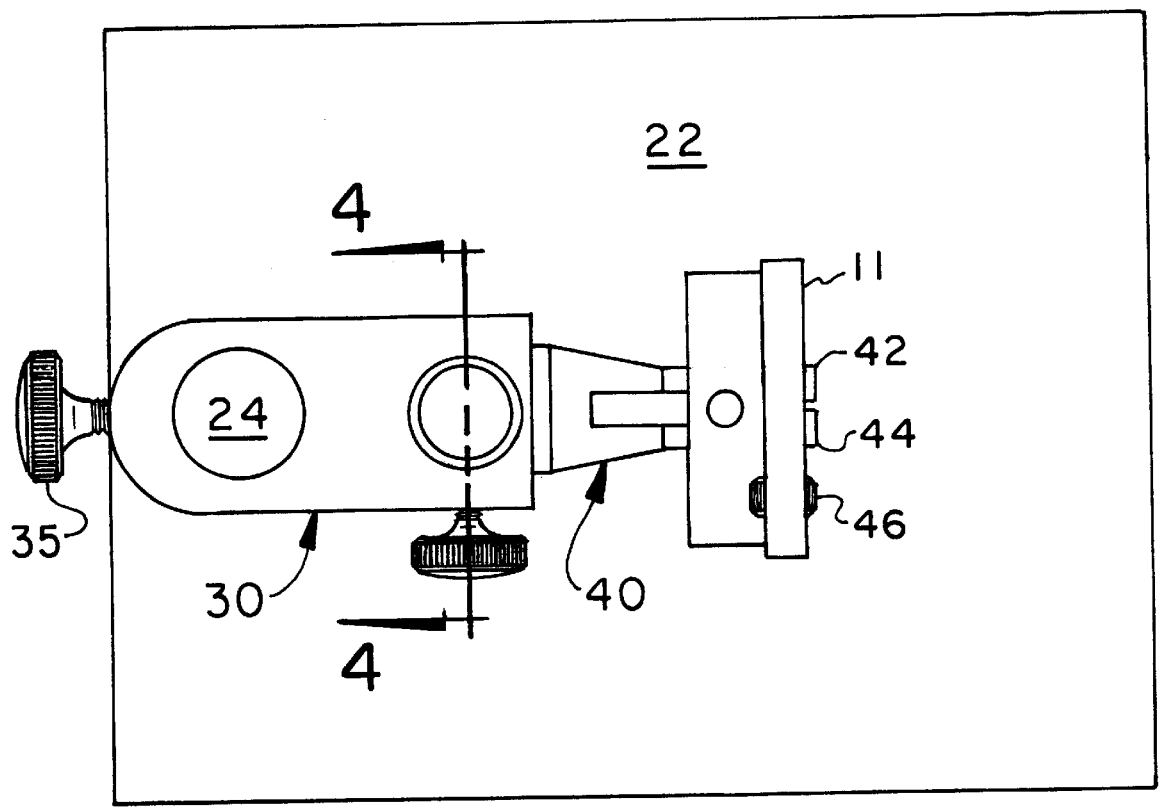
FIG. 3 is a top view of the first embodiment of the present invention.
Figure 4:
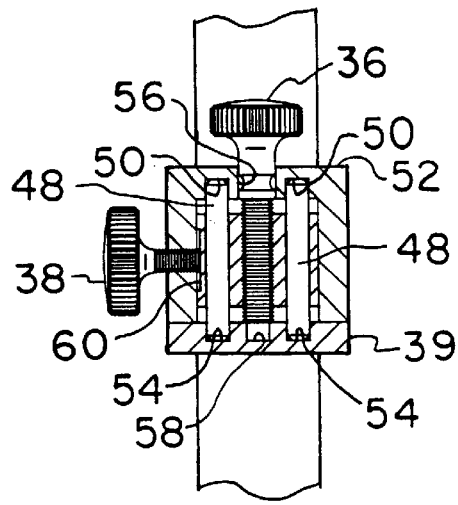
FIG. 4 is a cross-sectional front view of the platform used in the first embodiment.

Support arm 40 has a portion which is received in the hollow end 31 of platform 30. Arm 40, in this embodiment, has a split configuration providing first finger 42 and second finger 44 which can be drawn together by clamping screw 46 (FIG. 3). Support arm 40 rides upon two dowel pins 48 which pass entirely through arm 40 and are received in upper recesses 50 in upper wall 52 of platform 30 and in lower recesses 54 in access plate 39 which permits their insertion and removal. Similarly, fine adjustment screw 36 rotates in a bearing recess 56 in upper wall 52 and a lower bearing recess 58 in plate 39. Lateral pin 59 (FIG. 1) extends into upper bearing recess 56 and engages in an annular recess 37 in screw 36 to prevent its removal from platform 30. Bearing recesses 56 and 58 permit screw 36 to be rotated in platform 30 without axial motion. This rotation causes arm 40 to be translated vertically on screw 36 as a result of the complementary thread engagement between screw 36 and arm 40. The total throw of arm 40 is roughly ±⅛" an amount sufficient to provide fine adjustment for precision gauge 11. Locking screw 38 secures arm 40 in the desired adjusted position against undesired movement. An oval bearing recess 60 provides a surface which the lead end of screw 38 may engage at any position of adjustment of the arm 40.

Figure 5A:
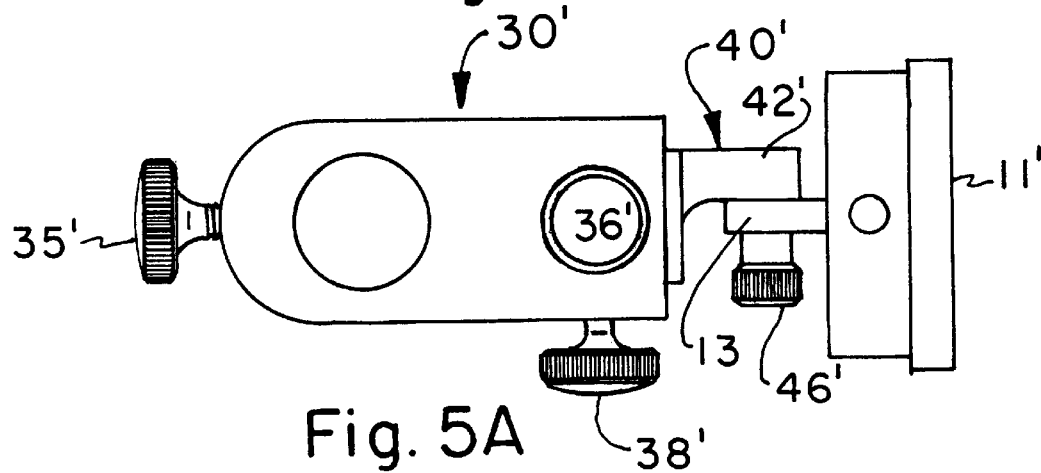
FIG. 5A is top view of second embodiment of platform and support arm.
Figure 5B:
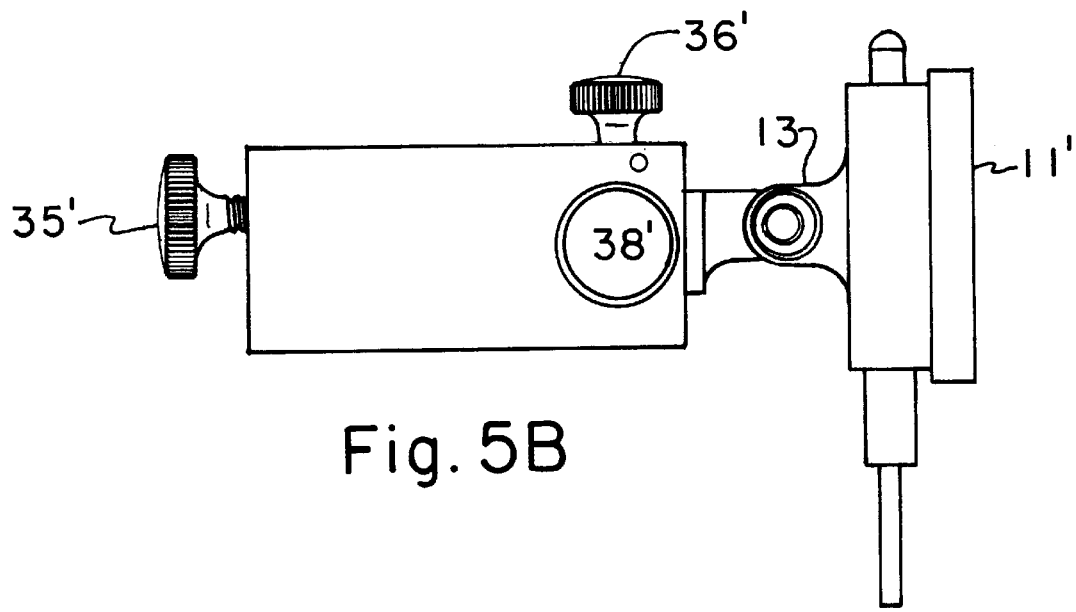
FIG. 5B is a side view of the second embodiment shown in FIG. 5A.

FIGS. 5A and 5B depict a second embodiment employing a different style support arm 40'. In this embodiment the ear 13 on precision gauge 11 is attached to arm 40' by threading screw 46' into finger 42'. The platform 30' receives the support arm 40' in the same manner as in the first embodiment and the adjustment and locking screws 35', 36' and 38' function in an identical manner.

The adjustable indicator mount 20 of the present invention provides a machined granite base block 22 that is smooth to within 0.0001 inch. Base block 22 can support the article to be measured and makes unnecessary the use of a large granite support table. A precision gauge 11 is supported on vertical post 24 by means of arm 40 which is mounted in an hollow end 31 of platform 30. The arm 40 and gauge 11 can be moved vertically on dowel pins 48 in pure translational motion by loosening locking screw 38 and rotating fine adjustment screw 36 to position the finger of gauge 11 in contact with the upper surface of a gauge block (not shown). Once the indicator mount 20 has positioned gauge 11 at the desired height, articles to be tested will be sequentially positioned on base block 22 to determine if they are within tolerances.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. A support assembly for an indicator gauge comprising
   a) a base block having a machined flat upper surface of sufficient size to support an article to be measured;
   b) a post secured to said base block and extending vertically therefrom;
   c) a platform adjustably secured for vertical sliding movement on said post;
   d) a laterally extending support arm for receiving the indicator gauge, said support arm being adjustably mounted upon said platform in manner to permit the indicator gauge to be adjusted vertically without having to be angularly tilted;
   e) an adjustment screw extending parallel to said post to translate said support arm solely in a vertical direction over a small range of motion relative to said platform to effect fine adjustment.

2. The support assembly of claim 1, wherein said flat upper surface of said base block is machined to within 0.0001 inch.

3. The support assembly of claim 1 further comprising a locking screw for securing said support arm in a desired adjusted position.

4. The support assembly of claim 3 further comprising a bearing recess machined into a side surface of said support arm to receive an engagement end of said locking screw.

5. The support assembly of claim 1 further comprising dowel pins mounted in said platform for guiding said support arm during said small range of motion.

6. The support assembly of claim 5 further comprising a removable plate which attaches to a lower portion of said platform to permit insertion and removal of said dowel pins.

7. The support assembly of claim 5 wherein said adjustment screw has an external thread which is received in a complementarily threaded orifice in said support arm, whereby when said adjustment screw is rotated said support arm moves vertically to adjust the position of said adjustment gauge.

8. The support assembly of claim 7 wherein said adjustment screw has two unthreaded portions which are received in upper and lower bearing regions of said platform to permit said adjustment screw to be rotated without translation relative to said platform.

9. The support assembly of claim 1 wherein said platform can accommodate two different styles of support arms.

10. A support assembly for an indicator gauge comprising
    a) a base block having a machined flat upper surface of sufficient size to support an article to be measured;
    b) a post secured to said base block and extending vertically therefrom;
    c) a platform adjustably secured for vertical sliding movement on said post;
    d) a laterally extending support arm for receiving the indicator gauge, said support arm being adjustably mounted upon said platform in manner to permit the indicator gauge to be adjusted vertically without having to be angularly tilted;
    e) an adjustment screw to move said support arm vertically over a small range of motion relative to said platform to effect fine adjustment; and
    f) a locking screw for securing said support arm in a desired adjusted position.

11. The support assembly of claim 10 further comprising a bearing recess machined into a side surface of said support arm to receive an engagement end of said locking screw.

12. The support assembly of claim 10 further comprising dowel pins mounted in said platform for guiding said support arm during said small range of motion.

13. The support assembly of claim 12 further comprising a removable plate which attaches to a lower portion of said platform to permit insertion and removal of said dowel pins.

14. The support assembly of claim 13 wherein said adjustment screw has an external thread which is received in a complementarily threaded orifice in said support arm, whereby when said adjustment screw is rotated said support arm moves vertically to adjust the position of said adjustment gauge.

15. The support assembly of claim 14 wherein said adjustment screw has two unthreaded portions which are received in upper and lower bearing regions of said platform to permit said adjustment screw to be rotated without translation relative to said platform.

16. A support assembly for an indicator gauge comprising
    a) a base block having a machined flat upper surface of sufficient size to support an article to be measured,
    b) a post secured to said base block and extending vertically therefrom;
    c) a platform adjustably secured for vertical sliding movement on said post;
    d) a laterally extending support arm for receiving the indicator gauge, said support arm being adjustably mounted upon said platform in manner to permit the indicator gauge to be adjusted vertically without having to be angularly tilted;
    e) an adjustment screw to move said support arm vertically over a small range of motion relative to said platform to effect fine adjustment; and
    f) dowel pins mounted in said platform for guiding said support arm during said small range of motion.

17. The support assembly of claim 16 further comprising a locking screw for securing said support arm in a desired adjusted position and a bearing recess machined into a side surface of said support arm to receive an engagement end of said locking screw.

18. The support assembly of claim 17 further comprising a removable plate which attaches to a lower portion of said platform to permit insertion and removal of said dowel pins.

19. The support assembly of claim 18 wherein said adjustment screw has an external thread which is received in a complementarily threaded orifice in said support arm, whereby when said adjustment screw is rotated said support arm moves vertically to adjust the position of said adjustment gauge.

20. The support assembly of claim 19 wherein said adjustment screw has two unthreaded portions which are received in upper and lower bearing regions of said platform to permit said adjustment screw to be rotated without translation relative to said platform.

* * * * *